(12) United States Patent
Ebner (10) Patent No.: US 10,422,509 B2
(45) Date of Patent: Sep. 24, 2019

(54) OPTICAL ELEMENT FOR A PLURALITY OF LEDS, AND ARRANGEMENT FOR LIGHT EMISSION

(71) Applicant: ZUMTOBEL LIGHTING GMBH, Dornbirn (AT)

(72) Inventor: Stephan Ebner, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 191 days.

(21) Appl. No.: 15/102,436

(22) PCT Filed: Dec. 17, 2014

(86) PCT No.: PCT/EP2014/078166
§ 371 (c)(1),
(2) Date: Jun. 7, 2016

(87) PCT Pub. No.: WO2015/091614
PCT Pub. Date: Jun. 25, 2015

(65) Prior Publication Data
US 2016/0312979 A1     Oct. 27, 2016

(30) Foreign Application Priority Data
Dec. 20, 2013   (DE) .................. 10 2013 226 970

(51) Int. Cl.
*F21V 13/04*     (2006.01)
*F21V 7/00*      (2006.01)
(Continued)

(52) U.S. Cl.
CPC .............. *F21V 13/04* (2013.01); *F21V 5/045* (2013.01); *F21V 7/0091* (2013.01);
(Continued)

(58) Field of Classification Search
CPC ........ F21V 13/04; F21V 5/045; F21V 7/0091; G02B 19/0028; G02B 19/0066; F21Y 2115/10
See application file for complete search history.

(56) References Cited

U.S. PATENT DOCUMENTS

| 2004/0070855 A1 | 4/2004 | Benitez et al. |
| 2013/0058104 A1 | 3/2013 | Catalano |
| 2014/0001507 A1 | 1/2014 | Streppel et al. |

FOREIGN PATENT DOCUMENTS

| DE | 102008036845 | 2/2010 |
| DE | 202012005157 | 6/2012 |

(Continued)

OTHER PUBLICATIONS

International Search Report for PCT/EP2014/078166, English translation attached to original, Both completed by the European Patent Office dated Mar. 5, 2015, All together 5 Pages.

(Continued)

*Primary Examiner* — Jack Dinh
(74) *Attorney, Agent, or Firm* — Andrus Intellectual Property Law (57) ABSTRACT

An optical element for influencing light emitted by a plurality of LEDs, which has a light entrance region for entrance of the light, and a light exit region situated opposite the light entrance region and serving for exit of the light. An arrangement for light emission comprising such an optical element and the LEDs are also disclosed. An axis (A) running both through the light entrance region and through the light exit region is defined by the shape of the optical element; the light exit region is subdivided by a ring-shaped indentation into a central middle region and an edge region arranged around the middle region. The light entrance region and the light exit region are shaped in such a way that, as (Continued)

viewed in a direction along the axis (A), they have an n-fold rotational symmetry, wherein n is a natural number greater than 2.

17 Claims, 9 Drawing Sheets

(51) Int. Cl.
*G02B 19/00* (2006.01)
*F21V 5/04* (2006.01)
*F21Y 115/10* (2016.01)

(52) U.S. Cl.
CPC ..... *G02B 19/0028* (2013.01); *G02B 19/0066* (2013.01); *F21Y 2115/10* (2016.08)

(56) References Cited

FOREIGN PATENT DOCUMENTS

| | | |
|---|---|---|
| DE | 102011015405 | 10/2012 |
| EP | 1681509 | 7/2006 |
| EP | 2211087 | 7/2010 |
| EP | 2469159 | 6/2012 |

OTHER PUBLICATIONS

Chinese Search Report for Chinese Application No. CN201480069001X, dated Feb. 24, 2018, 2 Pages.

Office Action dated May 13, 2019 in co-pending China Application 201480069001.X.

OPTICAL ELEMENT FOR A PLURALITY OF LEDS, AND ARRANGEMENT FOR LIGHT EMISSION

CROSS-REFERENCE TO RELATED APPLICATION

This application is the U.S. national phase of PCT Application No. PCT/EP2014/078166 filed on Dec. 17, 2014, which claims priority to DE Patent Application No. 10 2013 226 970.6 filed on Dec. 20, 2013, the disclosures of which are incorporated in their entirety by reference herein.

The invention relates to an optical element for influencing light emitted by a plurality of LEDs (LED: light-emitting diode), and to an arrangement for light emission having such an optical element and corresponding LEDs.

The prior art discloses such an optical element, which has a cutout by which the light from the LEDs is radiated in; the optical element has a light-exit region on the opposite side. In practice, arranging the optical element and the corresponding LEDs so that a desired emission characteristic with prespecified accuracy is reliably achieved has proven problematic and complicated.

The invention is based on the object of specifying an improved optical element and a corresponding improved arrangement. In particular, the aim is to obtain a reliable emission characteristic which can be controlled particularly well, together with an overall compact design.

This object is achieved according to the invention by way of the subject matter mentioned in the independent claims. Special types of embodiments of the invention are specified in the dependent claims.

According to the invention, provision is made for an optical element for influencing light emitted by a plurality of LEDs, which optical element has a light-entry region for entrance of the light and also a light-exit region, located opposite the light-entry region, for the exit of the light. The shape of the optical element defines an axis extending both through the light-entry region and through the light-exit region; the light-exit region is subdivided into a central middle region and an edge region arranged around the middle region by way of an annular cavity. The light-entry region and the light-exit region are shaped such that they have an n-fold rotational symmetry in a direction along the axis, with n being a natural number greater than 2.

It is possible with this design to arrange the LEDs such that each of the n formed rotational symmetry regions is assigned exactly one of the LEDs. Through this assignment, a particularly good controllability of the emission characteristic of the arrangement can be attained.

n preferably has a value between 3 and 10, in particular between 3 and 6. Hereby, a particularly uniform light emission can be obtained using the optical element.

As viewed at a right angle with respect to the axis, the middle region is preferably in the form of a segment of a circle in a first approximation. As a result, an advantageous lens effect of the optical element can be brought about.

The design is advantageously, from a light-technological point of view, such that, viewed in a projection along the axis, the middle region completely covers the light-entry region.

Preferably, a reflection surface region designed for total internal reflection of rays of the light is formed between the light-entry region and the light-exit region. Hereby, particularly good efficiency for the arrangement can be attained.

The light-entry region is preferably formed by a cutout. What can be achieved in this way is that a particularly large portion of the light emitted by the LEDs enters the optical element. The cutout preferably has a bottom region and a side-wall region; in particular, it can advantageously be formed by the bottom region and the side-wall region.

Particularly good light guidance can be achieved here if the reflection surface region is designed for total internal reflection of light rays that enter the optical element via the side-wall region. The optical element is furthermore advantageously configured such that further light rays that enter the optical element via the bottom region exit the optical element via the middle region.

The optical element is preferably configured in the form of an injection-molded part. This allows a particularly suitable configuration of the form of the optical element in a cost-effective manufacturing option.

The light-exit region preferably has structure elements having a convex shape. It is possible hereby to particularly suitably influence the emission characteristic advantageously with respect to manufacturing engineering.

The structure elements are preferably in the form of a segment of a sphere. Viewed in connection with one another, they can in particular have a line structure or an intersecting line structure. The structure elements can thus be produced particularly advantageously, in particular if the optical element is configured as an injection-molded part.

According to a further aspect of the invention, provision is made for an arrangement for light emission having an optical element according to the invention and LEDs, wherein the number of LEDs is n or n+1. In the case of n LEDs, they can be arranged particularly advantageously such that in each case exactly one of the LEDs is assigned to exactly one of the n rotational symmetry regions. In the case of n+1 LEDs, they can be arranged particularly advantageously such that in each case exactly one of the LEDs is assigned to exactly one of the n rotational symmetry regions and the one remaining last LED is arranged centrally with respect to the light-entry region.

The invention will be explained in more detail below on the basis of exemplary embodiments and with reference to the drawings, in which.

Figure 1:
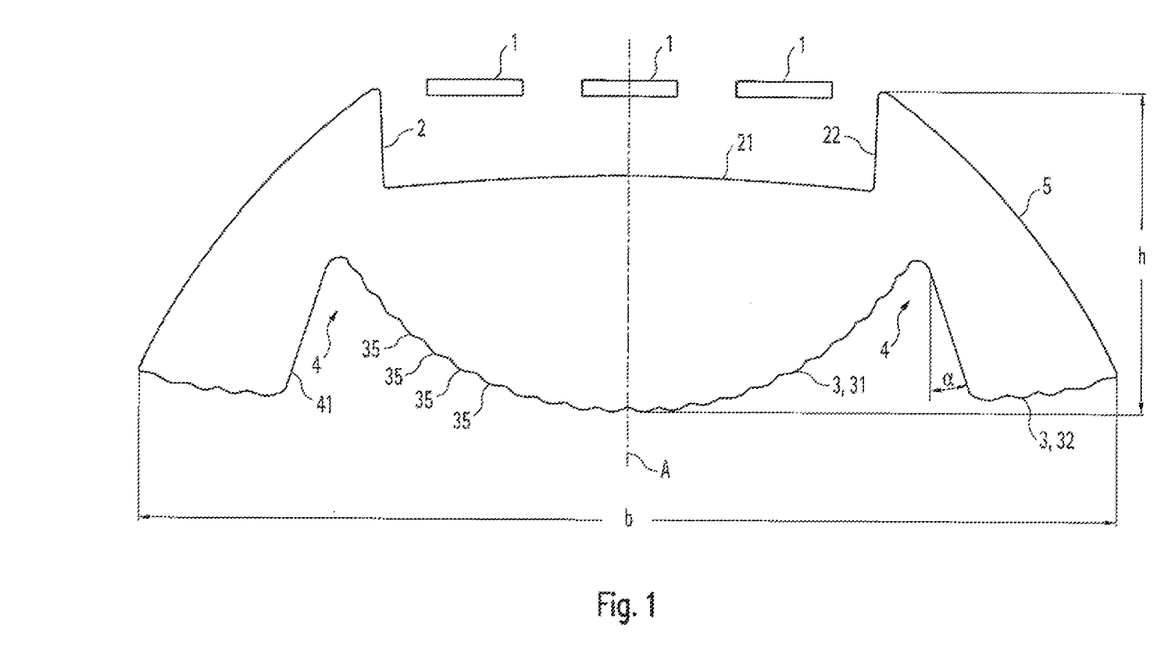
FIG. 1 shows a cross-sectional illustration regarding the principle of an arrangement according to the invention for light emission.
Figure 4:
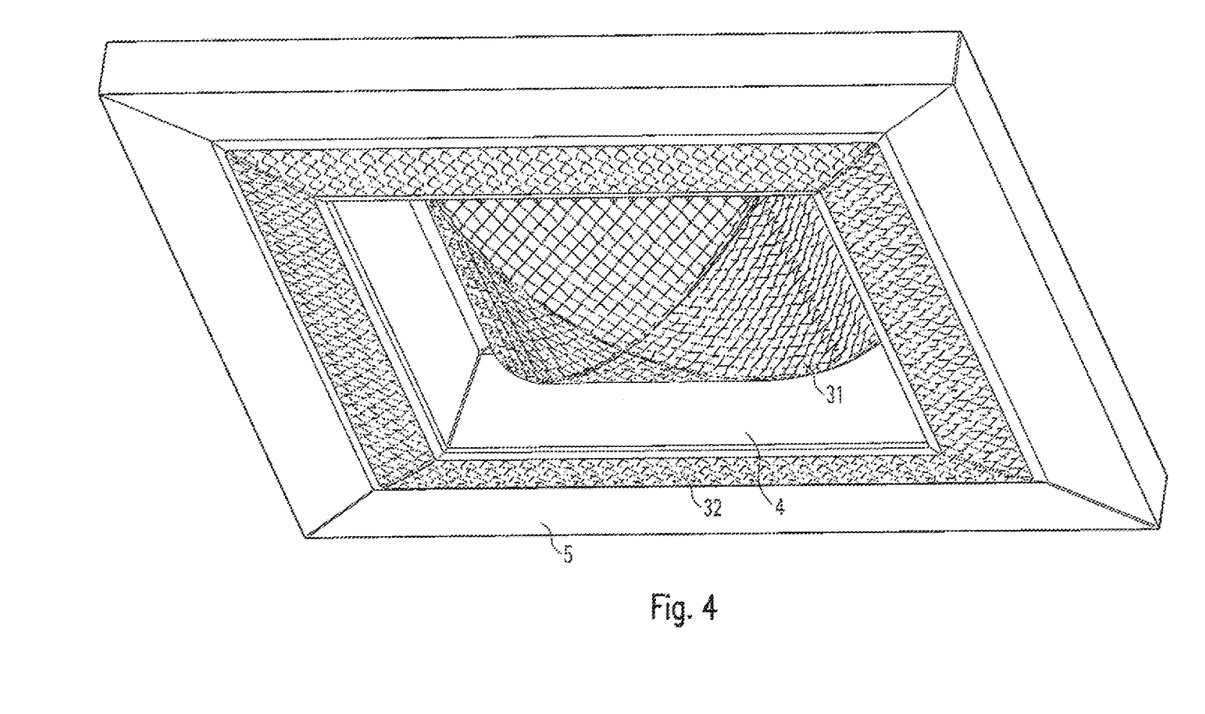
FIG. 4 shows a perspective illustration of an optical element according to the invention.
Figure 5:
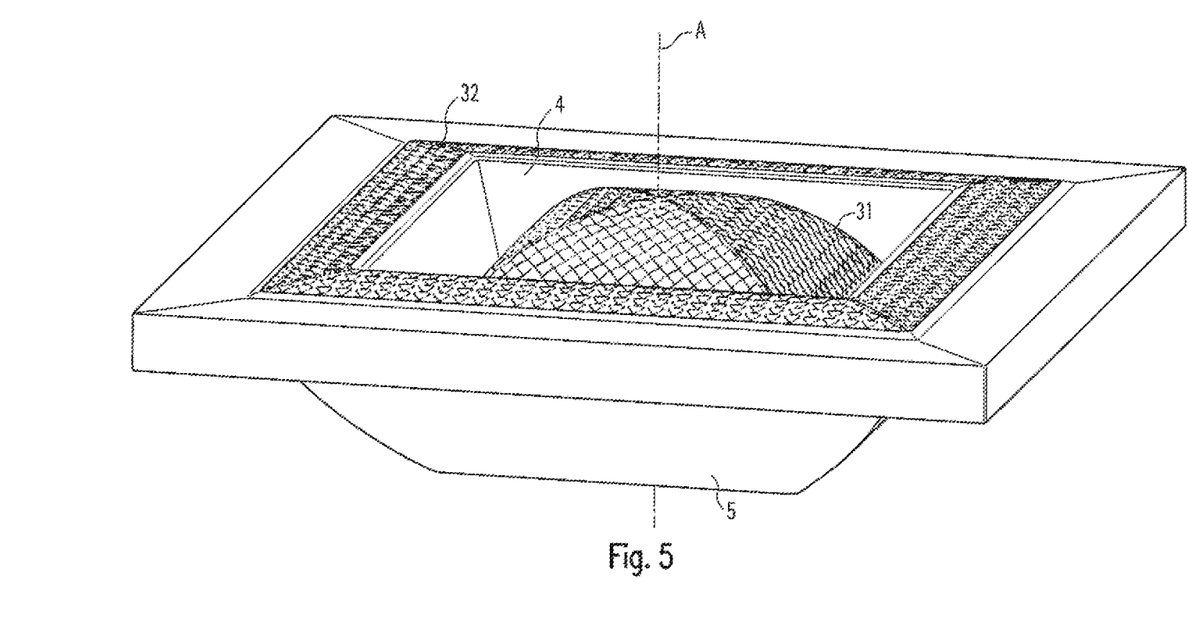
FIG. 5 shows a further perspective illustration of the optical element from a different viewing angle.

FIGS. 4 and 5 show the perspective illustrations of an optical element according to the invention. FIG. 1 shows a cross-sectional illustration for illustrating the operating principle of a corresponding optical element. The optical element is designed for influencing light emitted by a plurality of LEDs 1. An arrangement according to the invention for light emission comprises a corresponding optical element and said LEDs 1. The arrangement is configured in particular for attaining a directional light emission.

Advantages can be attained hereby compared to an optical element for merely one LED: a lamp that is provided with corresponding optical elements or arrangements can be configured such that it has an overall reduced number of optical elements or arrangements. This results in a reduction of installation effort.

The optical element has a light-entry region 2 for the entrance of the light and a light-exit region 3, located opposite the light-entry region 2, for the exit of the light. The optical element is configured such that its shape defines an axis A which extends both through the light-entry region 2 and through the light-exit region 3.

As can be seen, for example, from FIG. 5, the light-exit region 3 is subdivided into a central middle region 31 and an edge region 32 that is arranged around the middle region 31 by an annularly circumferential cavity 4. In the example illustrated here, the axis A extends through the middle region 31. The cavity 4 correspondingly extends in a closed circumferential form around the axis A. The edge region 32 also preferably extends in a closed circumferential form around the axis A.

The light-entry region 2 and the light-exit region 3 are shaped such that they have, viewed in a direction along the axis A, an n-fold rotational symmetry, with n being a natural number greater than 2. The design is preferably such that—as depicted in the figures—the axis A is here identical to the axis of said rotational symmetry.

When viewed in a direction parallel to the axis A onto the light-exit region 3, the latter therefore looks exactly the same after a rotation through the angle 360°/n about the axis A as before the rotation. The same is true for the light-entry region 2.

In other words, if the light-exit region 3 is projected onto a surface normal to the axis A, said projection has n rotational symmetry regions. The designation "rotational symmetry" is generally used for plane figures. However, the expression "rotational symmetry region" is in this case intended to designate the corresponding three-dimensional spatial region that is defined or formed by said projection along the axis A. Thus, n three-dimensional rotational symmetry regions are formed which all extend up to the axis A.

In the example shown here, the light-entry region 2 and the light-exit region 3 have a four-fold rotational symmetry. This can be seen clearly, for example, from the illustration of FIG. 2, which shows a view along the axis A onto the light-exit region 3. So in the example shown, four rotational symmetry regions I, II, III, IV are formed, which correspondingly have in each case an opening angle of 90° with respect to the axis A.

The entire optical element preferably has said rotational symmetry.

Figure 2:
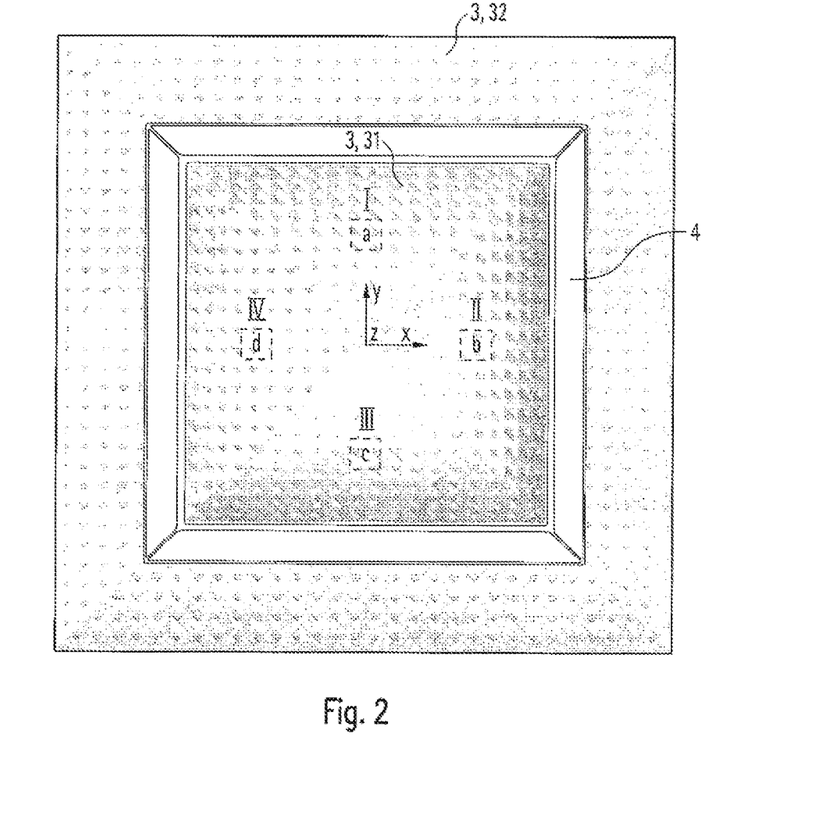
FIG. 2 shows a view of a light-exit region of an optical element according to the invention.

What can be attained through the rotational symmetry is that the LEDs 1 can be particularly suitably assigned to the individual rotational symmetry regions I, II, III, IV; as a result, a light guidance that can be controlled particularly well can be attained. What can be achieved in particular is that the light from the LEDs 1 is influenced in each case predominantly by that region of the optical element which is located in the respectively assigned rotational symmetry region I, II, III, IV.

The arrangement of the LEDs 1 opposite the optical element is here preferably such that one LED 1 is arranged in each of the rotational symmetry regions I, II, III, IV, as is depicted by way of example in FIG. 2 by way of the sites a, b, c, d for four LEDs 1 that are indicated by dashes. The arrangement generally comprises preferably either n LEDs 1 or n+1 LEDs 1, in the example shown that means four or five LEDs 1. The fifth LED 1 is here preferably arranged centrally with respect to the light-entry region 2, in particular such that it is intersected by the axis A.

In more general terms, the arrangement of the LEDs 1 in the case of an n-fold rotational symmetry and n LEDs is such that exactly one of the LEDs 1 is arranged in each of the n rotational symmetry regions. In the case of n+1 LEDs 1, the arrangement of the LEDs 1 is such that exactly one of the LEDs 1 is arranged in each of the n rotational symmetry regions, and the one remaining LED is arranged such that it centrally intersects the light-entry region 2 or the axis A.

What can be achieved with the stated arrangement of the LEDs 1 relative to the optical element is that the light emitted by one of the LEDs 1 passes through the optical element predominantly within that rotational symmetry region in which the relevant LED is arranged. Hereby, the particularly good controllability can be attained in a particularly suitable manner.

What can furthermore be attained by the stated design is that a small deviation when placing the LEDs 1 hardly has any noticeable influence on the light emission behavior of the arrangement. Even using an LED which slightly deviates from its specified value in terms of its size has very little influence on this. For attaining a specific emission characteristic to a certain accuracy, the arrangement according to the invention therefore permits relatively large play or manufacturing tolerances such that the manufacture of the arrangement is possible particularly cost-effectively overall.

Figure 6:
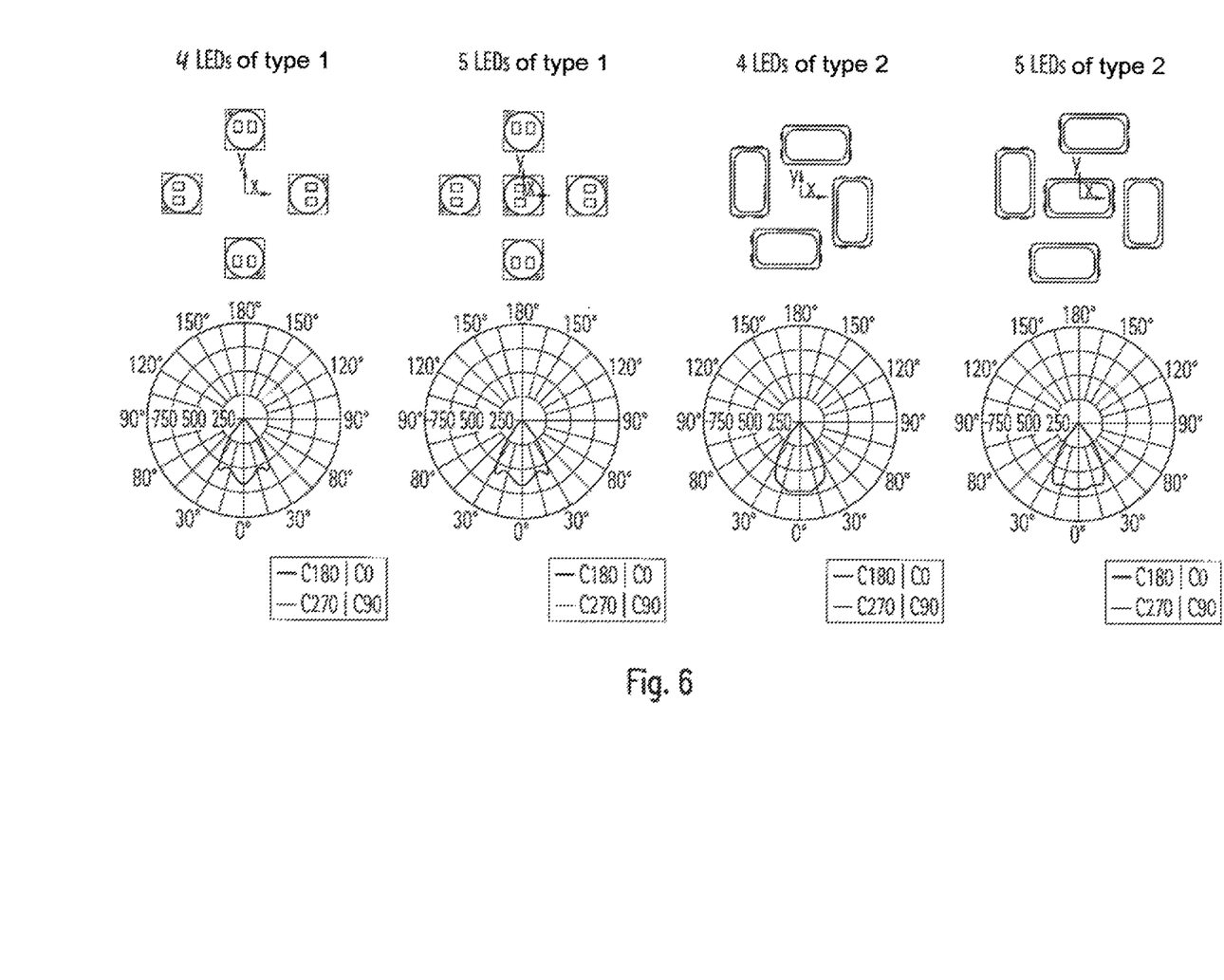
FIG. 6 shows four exemplary illustrations relating to differently designed arrangements and emission characteristics that can be attained therewith.

FIG. 6 shows a table illustrating four examples of differently configured arrangements having the respective emission characteristics; all arrangements here have a four-fold rotational symmetry.

In the first column from the left, in the second row, the arrangement of four LEDs of a type 1 is depicted, corresponding to the sites a, b, c, d depicted in FIG. 2. In the third row, the associated light distribution curve is shown. The second column shows a corresponding representation which relates to an arrangement in which, in contrast to the first column, a fifth LED is arranged in the middle, that is to say such that it intersects the axis A. The light distribution curve is very similar to that of the first column. Adding a fifth LED thus has a relatively minor influence on the light emission characteristic.

The representation in the third column relates to an arrangement in which again four LEDs are used, but of a type 2 having larger light-emitting surfaces than the LEDs of type 1 that are shown in the first 2 columns. The corresponding light distribution curve is here more uniform. The fourth column correspondingly once again relates to an arrangement having five LEDs; once again the addition of the fifth LED has no significant influence on the light emission characteristic.

The number of LEDs can thus be varied within certain limits without this resulting in a significant change in the emission characteristic.

Particularly suitable is a rotational symmetry in which the value n is between 3 and 10, in particular between 3 and 6. This makes possible a particularly uniform arrangement of LEDs 1 opposite the light-exit region 2. In the case of a three-fold or four-fold or six-fold rotational symmetry, particularly easy stacking of a plurality of corresponding optical elements is additionally made possible.

As is shown by way of example in FIG. 1, the optical element is preferably configured such that the middle region 31, viewed at a right angle with respect to the axis A, is in the form of a segment of a circle in a first approximation. In particular, the shape here is such that, viewed in a projection along the axis A, the middle region 31 completely covers the light-entry region 2. As a result, particularly suitable bundling can be effected for the majority of the light emitted by the LEDs 1. This is illustrated in FIG. 3, in which a few exemplary rays of the light emitted by the LEDs 1 are shown in an exemplary fashion.

With further preference, as indicated for example in FIGS. 1 and 5, a reflection surface region 5 which is designed for total internal reflection of light rays is formed between the light-entry region 2 and the light-exit region 3. Hereby, an overall broad light emission can be achieved. The reflection surface region 5 preferably extends up to the light-entry region 2.

The light-entry region 2 is preferably formed by a cutout. The cutout here preferably has a bottom region 21 and a side-wall region 22. As is depicted in the figures, the cutout can be formed in particular by the bottom region 21 and the side-wall region 22. The LEDs 1 are preferably arranged within the cutout, at least with their light-emitting surface regions. A particularly high light-technology efficiency of the arrangement can be achieved hereby.

Figure 3:
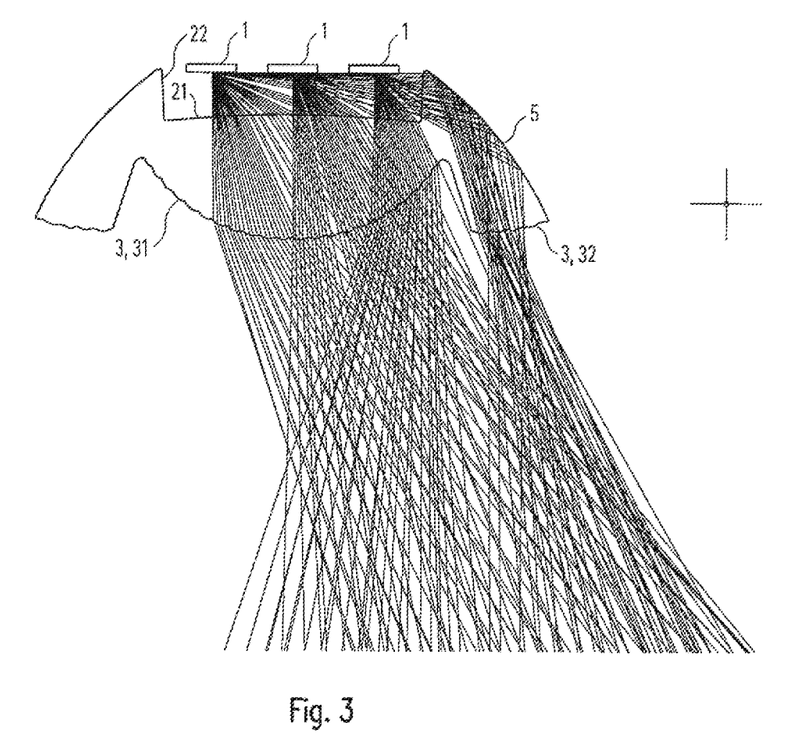
FIG. 3 shows a cross-sectional illustration through the arrangement with exemplary light rays.

As is clear in particular from FIG. 3, the design is here preferably such that the reflection surface region 5 is designed for total internal reflection of light rays that enter the optical element via the side-wall region 22, and furthermore further light rays, which enter the optical element via the bottom region 21, preferably exit the optical element by the middle region 31.

The design is here preferably such that that portion of the light emitted by the LEDs 1 that enters the optical element via the side-wall region 22 undergoes total internal reflection at least predominantly at the reflection surface region 5 and that further portion of the light emitted by the LEDs 1 which enters the optical element by the bottom region 21 exits the optical element at least predominantly via the middle region 31.

In other words, provision may be made in particular for the shape of the optical element to be designed such that the light emitted by the LEDs 1 is split into two main paths, with the first main path leading through the bottom region 21 into the optical element and out of the optical element by the middle region 31. The second main path relates to the light that is emitted more flatly by the LEDs 1 and leads into the optical element via the side-wall region 22 and out of the optical element via the edge region 32. The portion of the light that follows the first main path is guided by way of refraction and that further portion that follows the second main path undergoes total internal reflection and is thus influenced in terms of its direction.

As becomes clear from FIG. 1, the described shape forms quasi a "middle lens" which is limited on the side of the light exit by the middle region 31 and which is "set back" with respect to the edge region 32, that is to say is set back in the direction of the light-entry region 2. What can be attained in this way is that the optical element overall can be designed with particularly little installation space by comparison and with a small extent h along the axis A, that is to say a low "installation height" h. This is advantageous with respect to the manufacturing options. In particular, a particularly short manufacturing time and particularly cost-effective manufacturing can be achieved in this way.

The design of the optical element is preferably such that for its extent b transversely to the axis A in relation to the installation height h, the following is met: $0.20<h/b<0.50$, preferably $0.25<h/b<0.40$.

It is additionally possible by selecting the "height positioning" of the middle lens to control the proportional splitting of the light into the two main paths and to guide more or less light, depending on the requirements, onto the reflection surface region 5. It is possible hereby to significantly influence the properties of the arrangement particularly suitably.

The optical element is preferably configured as an injection-molded part. This makes possible particularly advantageous manufacturing of the optical element.

As is indicated by way of example in FIG. 1, the light-exit region 3 preferably has structure elements 35 of convex shape. Hereby, the light emission of the arrangement can furthermore be suitably influenced. The structure elements 35 can be, by way of example, in the form of a segment of a sphere; however, with particular preference they have elongate structures or forms, i.e. quasi "lines," in particular parallel lines, for example in the manner of cylindrical lenses. Said structure elements 35 or cylindrical lenses can extend in particular also on curved surface regions of the optical element. Thus the structure elements 35 can also be formed such that they exhibit intersecting lines, that is to say for example "cylindrical lenses running in an intersecting manner," such that some type of micro-prism optics are formed.

Figure 7:
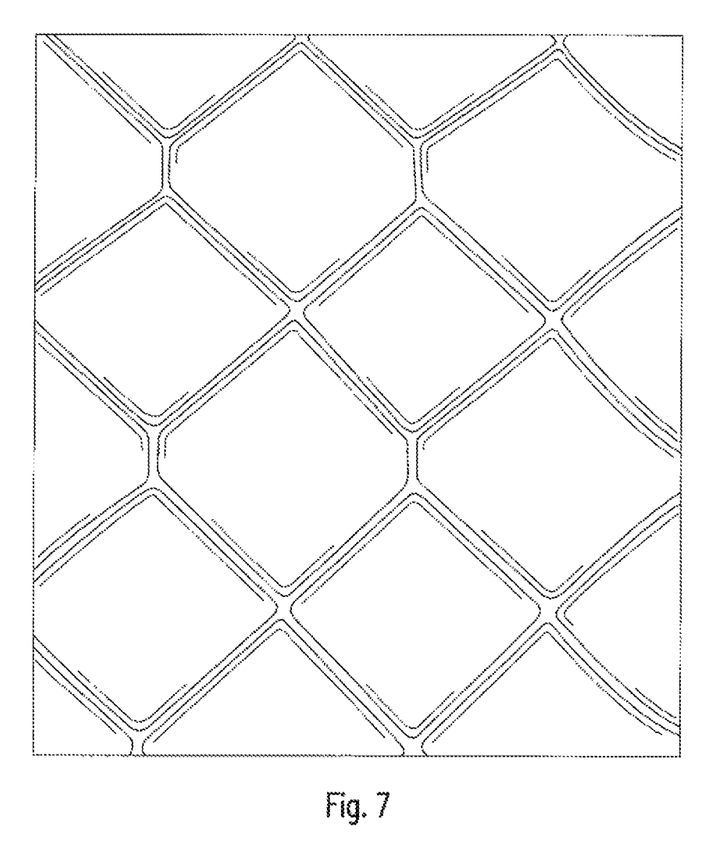
FIG. 7 shows an enlarged detail from a surface region of a molding tool for manufacturing the optical element in the form of an injection-molded part.
Figure 8:
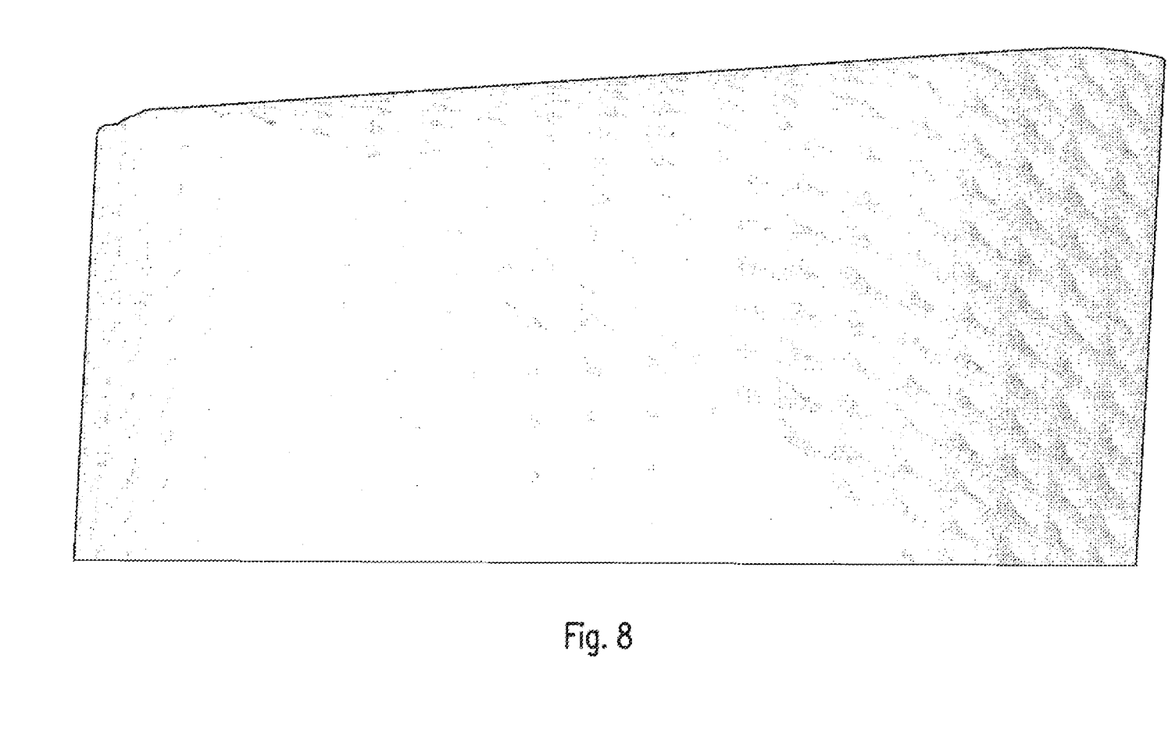
FIG. 8 shows a section of the correspondingly produced middle region of the optical element.

A particularly suitable option for manufacturing the structure element 35 is to configure the optical element as an injection-molded part and in the process to machine the relevant molding tool which corresponds to the structure elements 35 using a rotating tool in order to in this way shape the negative surface regions corresponding to the structure elements 35. A suitable rotating tool is here for example a ball cutter. In this way, the structure elements can advantageously be formed particularly suitably in particular also on overall curved surface regions of the optical element, i.e. for example on the curved surface of the middle region 31. FIG. 7 illustrates such a surface region of a molding tool in enlarged fashion by way of example. FIG. 8 shows, enlarged, a correspondingly configured surface region of the middle region 31.

It is possible by way of the structure elements 35 to achieve a further improved influenceability of the light guidance. In particular, it is possible to avoid or reduce losses from backscatter by way of the structure elements 35. It is furthermore possible using the structure elements to quasi resolve or reduce particularly high point luminance. What can also be achieved is that light from the LEDs is mixed better from different emission angles. It is hereby possible in particular to significantly reduce the negative effect of a phosphor corona. Overall, improved color mixing of the light is effected.

Undesired total internal reflection at the structure elements 35 can be avoided by designing the structures such that they do not exceed a specific size or by selecting the steepness of the structure surfaces such that it is not too great. In this way, it is possible in particular to avoid an undesired, disturbing light scattering proportion.

The structure elements 35 here do not all have to be configured with the same radius. Different radii can be provided and also different depths. In this way, it is possible to influence the directional dependence of the light emission in a very targeted and fine manner. Asymmetrical shapes or geometrical shapes of any desired design can also be used.

However, the outlay for producing the molding tool is generally significantly increased in this case. Is also possible to use structures that can be introduced by a more complicated method and processing of the molding tool, for example intersecting concave-convex structures.

In the example illustrated here, the structure elements 35 are formed in the entire surface of the middle region 31. In addition, the structure elements 35 are formed in the edge region 32. The cavity 4 is formed—with respect to the axis A—on the inside by an edge region of the middle region 31 and on the outside by an oblique surface region 41 which extends outwardly up to the edge region 32; this oblique surface region 41 preferably has no structure elements 35 since no significant light throughput is intended here, as can be seen from the representation in FIG. 3. The oblique surface region 41 is preferably shaped such that it encloses with the axis A an angle α which is less than 40°, with particular preference less than 30°.

Alternatively or additionally, the structure elements 35 can also be formed in the light-entry region 2.

Figure 9:
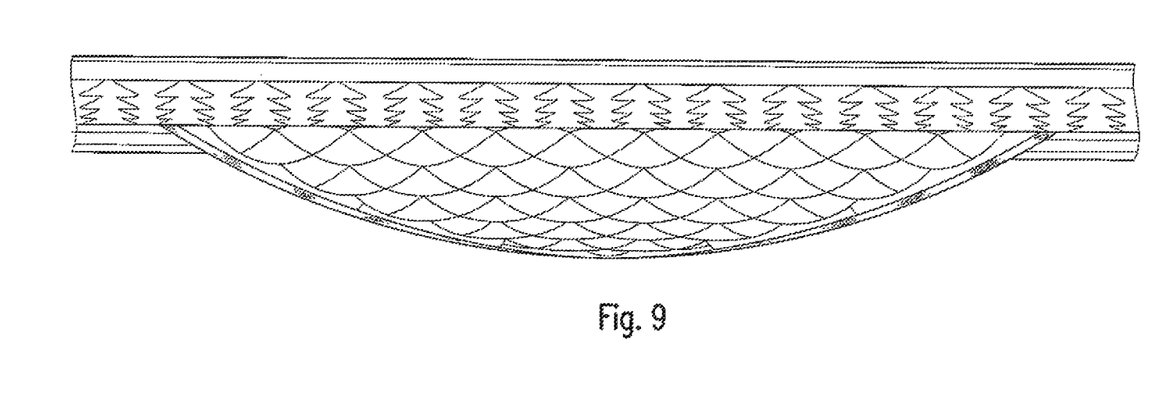
FIG. 9 shows an example of a lens having structure elements.

In more general terms, the structure elements 35 can be used advantageously not only in the optical element described here, but in lenses generally, specifically both in the light-entry region and in the light-exit region. FIG. 9 schematically shows a cross section through a corresponding lens.

The invention claimed is:

1. An optical element for influencing light emitted by a plurality of LEDs, the optical element comprising:
    an injection-molded body defining;
    a light-entry region for the entrance of the light,
    a light-exit region, located opposite the light-entry region, for the exit of the light, and a reflection surface region located between the light-entry region and the light-exit region,
    wherein an axis (A) extending both through the light-entry region and through the light-exit region is defined by the shape of the optical element,
    wherein the light-exit region is subdivided into a central middle region and an edge region arranged around the middle region by way of an annular cavity,
    wherein the light-entry region and the light-exit region are shaped such that they have an n-fold rotational symmetry, viewed in a direction along the axis (A), with n being a natural number greater than 2; and
    wherein the reflection surface region provides a total internal reflection of rays of a portion of the light passing between the light-entry region and the light-exit region.

2. The optical element as claimed in claim 1, in which n has a value between 3 and 10.

3. The optical element as claimed in claim 1, in which the middle region, viewed at a right angle with respect to the axis (A), is in the form of a segment of a circle in a first approximation.

4. The optical element as claimed in claim 1, in which, viewed in a projection along the axis (A), the middle region completely covers the light-entry region.

5. The optical element as claimed in claim 1, in which the light-entry region is formed by a cutout.

6. The optical element as claimed in claim 5, in which the cutout has a bottom region and a side-wall region.

7. The optical element as claimed in claim 6, which is configured such that further light rays that enter the optical element via the bottom region are refracted to exit the optical element via the middle region.

8. The optical element having the features stated in claim 5, in which the reflection surface region is designed for total internal reflection of light rays that enter the optical element via the side-wall region such that exits the optical element via the edge portion.

9. The optical element as claimed in claim 5, wherein light rays that enter the injection-molded body via a side-wall region of the cutout impinge on the reflection surface region directly without previously being reflected at the light-exit region and the light rays internally reflected by the reflection surface region exit the optical element via the edge portion of the light-exit region.

10. The optical element as claimed in claim 1, in which the light-exit region has structure elements having a convex shape, and the convex structure elements are on the central middle region and on the edge region of the light-exit region.

11. The optical element as claimed in claim 10, in which the structure elements are in the form of a segment of a sphere or cylinder, or when viewed in connection with one another have a line structure or an intersecting line structure.

12. An arrangement for light emission having an optical element according to claim 1,
    wherein the number of LEDs is n or n+1; and one LED is arranged in each region of rotational symmetry.

13. An arrangement for light emission according to claim 12 wherein the number of LEDs is n+1;
    one LED is arranged in each region of rotational symmetry; and
    one LED is arranged such that it centrally intersects the axis A in the light entry region.

14. The optical element as claimed in claim 1, in which n has a value between 3 and 6.

15. An arrangement for light emission comprising:
    a plurality of LEDs; and
    an optical element for influencing light emitted by the plurality of LEDs, wherein the optical element comprises:
    an injection-molded body defining a light-entry region for the entrance of the light, a light-exit region located opposite the light-entry region for the exit of the light, and a reflection surface region located between the light-entry region and the light-exit region;
    an axis (A) extending both through the light-entry region and through the light-exit region is defined by the shape of the optical element and serves as an axis of symmetry;
    wherein the light-entry region is formed by a cutout having sidewalls, and the light-exit region is subdivided into a central middle region and an edge region arranged around the central middle region by way of an annular cavity formed by oblique surface regions extending from respective edges of the central middle region to the edge region on the light-exit region, and the edges of the central middle region form a square;
    wherein the light-entry region and the light-exit region are shaped such that they have 4-fold rotational symmetry when viewed in a direction along the axis (A), and the central middle region, when viewed at a right angle with respect to the axis (A), has a center point along the axis (A) that is located farther in the light emitting direction along the axis (A) than the edges of the central middle region; and
    further wherein the plurality of LEDs emit light into the cutout defining the light emitting region, the light is transmitted through the optical element and emitted through the central middle region and edge region of the light-exit region and the surfaces of the central middle region and the edge region have structure elements that influence the direction of the emitted light by refraction.

16. The arrangement according to claim 15, in which the central middle region of the light-exit region of the optical element, when viewed at a right angle with respect to the axis (A), is in the form of a segment of a circle in a first approximation.

17. The arrangement according to claim 16, in which the central middle region of the light-exit region of the optical element, when viewed in a projection along the axis (A), completely covers the light-entry region.

\* \* \* \* \*